(12) United States Patent
Miyoshi et al.

(10) Patent No.: US 10,044,694 B2
(45) Date of Patent: Aug. 7, 2018

(54) SERVER, METHOD AND SYSTEM FOR AUTHENTICATING APPLICATION

(71) Applicant: FUJITSU LIMITED, Kawasaki-shi, Kanagawa (JP)

(72) Inventors: Naoki Miyoshi, Machida (JP); Akio Shimono, Yokohama (JP); Mamoru Yoshimuta, Ota (JP); Shouhei Mizuno, Itabashi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/104,309

(22) Filed: Dec. 12, 2013

(65) Prior Publication Data

US 2014/0215565 A1 Jul. 31, 2014

(30) Foreign Application Priority Data

Jan. 30, 2013 (JP) .................................. 2013-016251

(51) Int. Cl.
| | | |
|---|---|---|
| *H04L 9/32* | (2006.01) | |
| *G06F 21/00* | (2013.01) | |
| *G06F 7/04* | (2006.01) | |
| *H04L 29/06* | (2006.01) | |
| *H04L 29/08* | (2006.01) | |

(52) U.S. Cl.
CPC .......... *H04L 63/08* (2013.01); *H04L 67/2814* (2013.01); *H04L 63/10* (2013.01)

(58) Field of Classification Search
None
See application file for complete search history.

(56) References Cited

U.S. PATENT DOCUMENTS

| | | | | |
|---|---|---|---|---|
| 9,338,007 | B1 * | 5/2016 | Doshi | ................. H04L 63/0815 |
| 2007/0244973 | A1 * | 10/2007 | Pearson | ............... G06Q 10/107 |
| | | | | 709/206 |
| 2009/0150287 | A1 * | 6/2009 | Campbell et al. | .............. 705/44 |
| 2011/0179477 | A1 * | 7/2011 | Starnes | ................... G06F 21/52 |
| | | | | 726/9 |
| 2012/0117626 | A1 * | 5/2012 | Yates et al. | ....................... 726/4 |
| 2012/0240214 | A1 | 9/2012 | Ogura et al. | |

FOREIGN PATENT DOCUMENTS

JP 2012-194722 10/2012

OTHER PUBLICATIONS

Chinese Office Action dated May 24, 2016 in corresponding Chinese Patent Application No. 20130734037.2.

(Continued)

*Primary Examiner* — Alexander Lagor
(74) *Attorney, Agent, or Firm* — Staas & Halsey LLP

(57) ABSTRACT

An application authentication program causes a data server and an application server to execute the processes of: accepting an access request containing application-related information and redirection information from an application running on a communication terminal; and when judging that the redirection information is legitimate, transmitting an access response being a response to the access request and containing application identification information corresponding to the application-related information to the communication terminal including a redirection destination corresponding to the redirection information.

6 Claims, 13 Drawing Sheets

(56) References Cited

OTHER PUBLICATIONS

Japanese Office Action dated Aug. 16, 2016 in corresponding Japanese Patent Application No. 2013-016251.
Ogino, "Let Website Correspond to Facebook, Utilization of Social Plugin and Practice of Authentication from External Site", WEB+DB Press, vol. 61, Gijutsu-Hyohron Co., Ltd., Mar. 25, 2011, Japan, pp. 146 to 151.
"New Form of ICT with Focus on User Data", Fujitsu, vol. 64 No. 1, Fujitsu Limited, Jan. 10, 2013, Japan, pp. 102 to 110.
Chinese Office Action dated Aug. 24, 2017 in corresponding Chinese Patent Application No. 201310734037.2, 8 pages.

\* cited by examiner

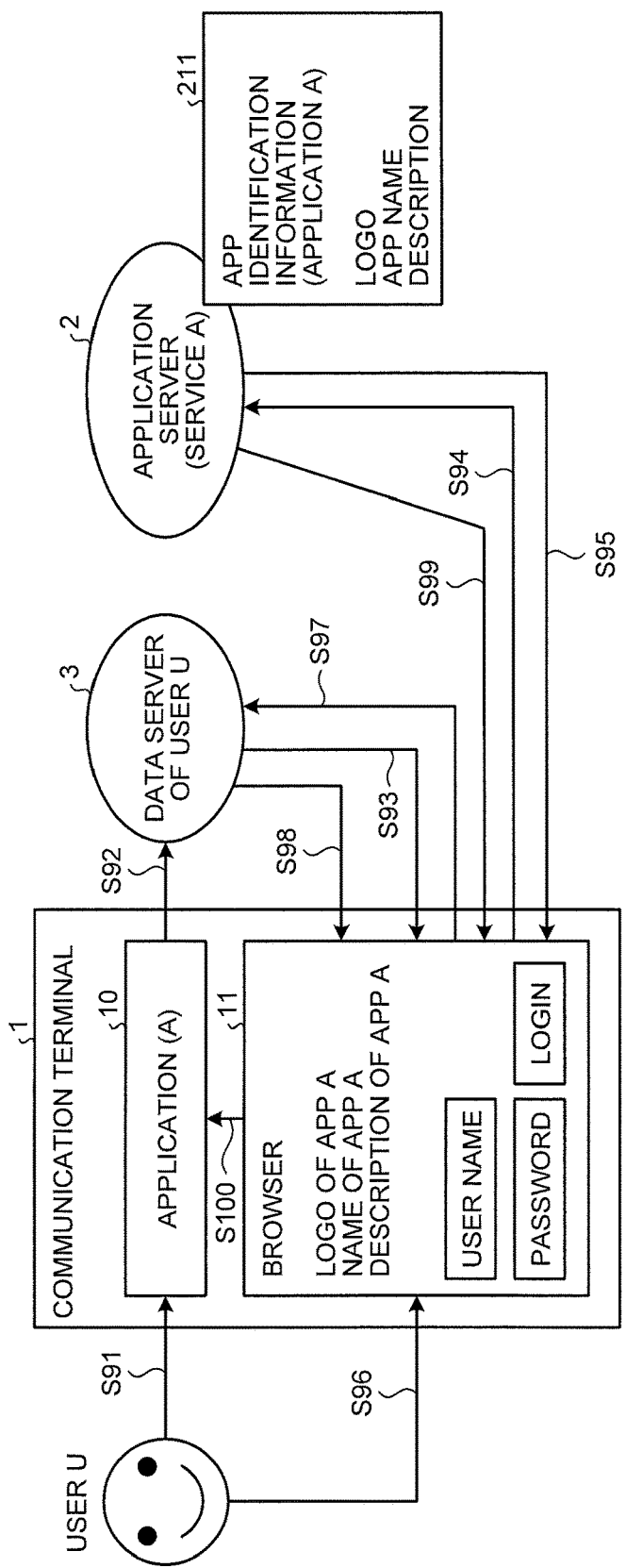

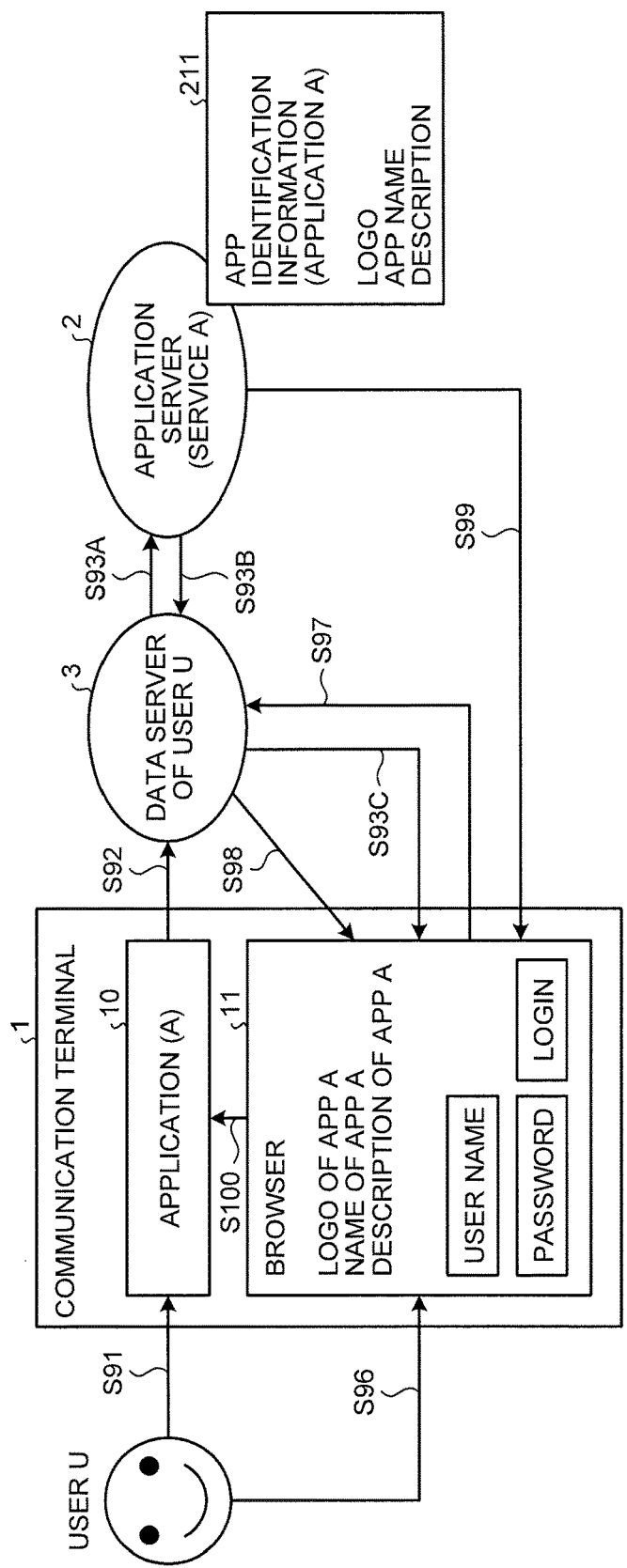

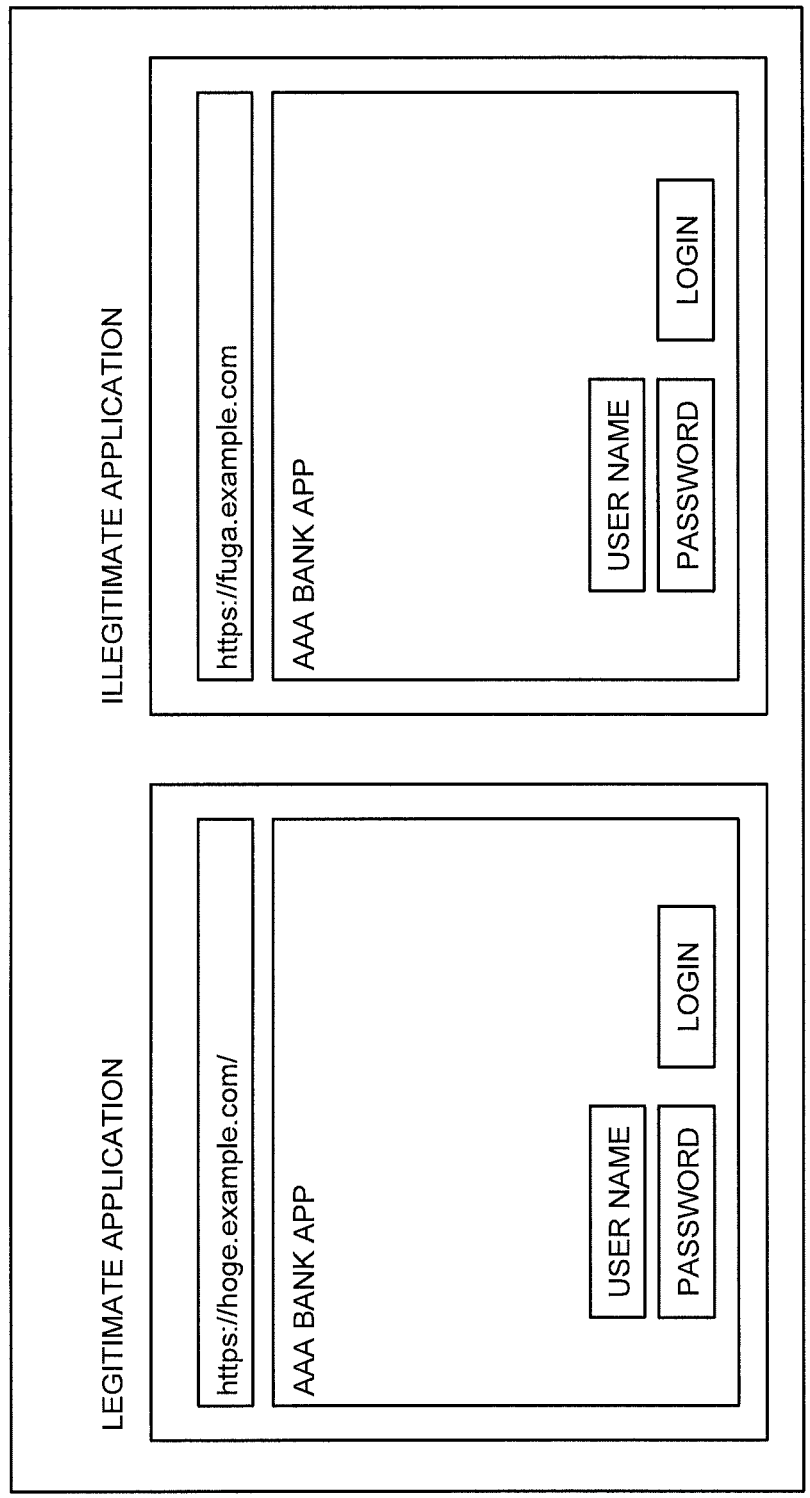

SERVER, METHOD AND SYSTEM FOR AUTHENTICATING APPLICATION

CROSS-REFERENCE TO RELATED APPLICATION(S)

This application is based upon and claims the benefit of priority of the prior Japanese Patent Application No. 2013-016251, filed on Jan. 30, 2013, the entire contents of which are incorporated herein by reference.

FIELD

The embodiment discussed herein is directed to an application authentication program and the like.

BACKGROUND

In recent years' services provided on the Internet, the services are provided not via generalized applications such as Web browsers, but via applications dedicated to the services. In such service provision, a service providing side performs authentication of permission by an application for access (application authentication) in addition to authentication of permission for connection by a user to a service (user authentication) by using the application.

In the authentication of the permission by the application for access, for example, a provider or creator of the application preregisters authentication information of the application used by the user with the service providing side, and the service providing side issues an identification ID and password of the application. The service providing side then performs authentication using the identification ID and password of the application upon connection from the application to the service. When the authentication is complete, the service providing side issues a token. The application uses the token to access the service in response to operations of the user. OAuth2 is known as the application authentication method (see Japanese Laid-open Patent Publication No. 2012-194722).

In some cases, a service providing side provides a service over a plurality of sites, and the authentication information of an application is not shared between the plurality of sites. In such a case, for example, a provider of the application registers the authentication information of the application to be used with every site to be used and therefore there is a problem that the app authentication becomes complicated.

The problem that the app authentication becomes complicated will be described here with reference to FIGS. 11 and 12. FIG. 11 is a diagram illustrating services using OAuth2. FIG. 12 is a diagram illustrating the problem that the app authentication becomes complicated.

As illustrated in FIG. 11, for example, an application provider on a service providing side registers with an authentication server, for example, an app list as authentication information of apps A, B, C, and D in services using OAuth2. The authentication server can perform app authentication of the applications of the apps A, B, C, and D with OAuth 2.

As illustrated in FIG. 12, the service may be provided over a plurality of sites on the service providing side. If the authentication information is not shared between the authentication servers of the plurality of sites, for example, the application provider on the service providing side needs to register the application used with each authentication server, which leads to complicated app authentication.

If the service providing side does not have the authentication information of the application to avoid the complication of the app authentication, there is a problem that a user does not detect that the application that the user is using is not performing legitimate communication. For example, the user may be deceived by an illegitimate application. An example of a case of being deceived by an illegitimate application will be described with reference to FIG. 13. FIG. 13 is a diagram illustrating the example of the case of being deceived by an illegitimate application.

A screen illustrated in the left of FIG. 13 is a screen displayed by a legitimate application. A screen illustrated in the right of FIG. 13 is a screen displayed by an illegitimate application pretending to be the legitimate application (for example, a phishing application). A difference between them is only their URLs and their display contents are the same. Therefore, the user may input his/her password without noticing. In other words, the user does not detect that the application is not performing legitimate communication.

SUMMARY

According to an aspect of an embodiment, a non-transitory computer-readable recording medium stores a program. The program causes a computer to execute an application authentication process. The application authentication process includes accepting an access request containing application-related information and redirection information from an application running on a terminal; and when judging that the redirection information is legitimate, transmitting to a redirection destination corresponding to the redirection information an access response being a response to the access request and containing application identification information corresponding to the application-related information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating a sequence of an application authentication process according to the embodiment;

FIG. 7 is a diagram illustrating a sequence of a modification of the application authentication process according to the embodiment;

FIG. 13 is a diagram illustrating an example of a case of being deceived by an illegitimate application.

DESCRIPTION OF EMBODIMENT(S)

Preferred embodiments of the present invention will be explained with reference to accompanying drawings. The present invention is not limited by the embodiment.

Configuration of Data Reference System

Figure 1:
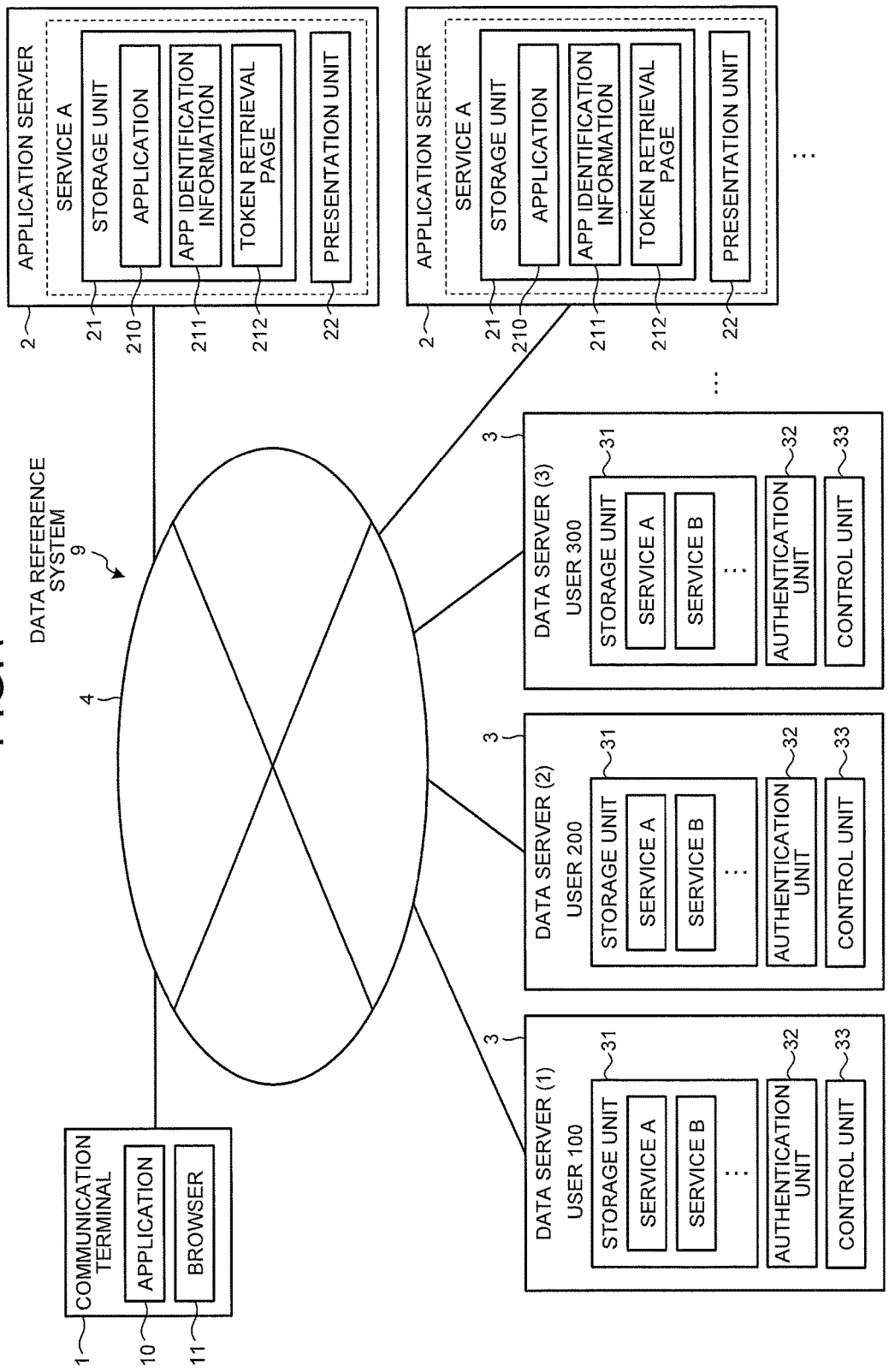
FIG. 1 is a block diagram illustrating an entire configuration of a data reference system according to an embodiment.

FIG. 1 is a block diagram illustrating an entire configuration of a data reference system according to the embodiment. As illustrated in FIG. 1, a data reference system 9 includes a communication terminal 1, a plurality of application servers 2, and a plurality of data servers 3. The communication terminal 1 is connected to the plurality of application servers 2 and the plurality of data servers 3, respectively, via a network 4 representing the Internet network.

The communication terminal 1 is provided with a service by using an application. The application allows the application server 2 to provide the service. The data server 3 manages data created accompanied by the service. In other words, the data reference system 9 allows the communication terminal 1 to use applications respectively provided by the plurality of application servers 2 while accessing the data server 3 specified by a user of the communication terminal 1 and collectively managing the user's personal data in the above data server 3. In this manner, the data reference system 9 adopts a configuration of separating the application servers 2 from the data servers 3 and accordingly enables the user of the communication terminal 1 to collectively manage data under his/her control.

An application 10 and a browser 11 are stored in the communication terminal 1. It is sufficient if the communication terminal 1 is a communication terminal that can communicate, for example, a smartphone, a PHS (Personal Handyphone System), a PDA (Personal Digital Assistants), or a PC (Personal Computer).

The application 10 is software for allowing the communication terminal 1 to receive a service provided by the application server 2. The communication terminal 1 acquires an application corresponding to a service that the user desires to receive from the application server 2 that provides the service, and stores the service in, for example, RAM (Random Access Memory) or an HDD (Hard Disk Drive).

The application 10 transmits its own authentication request to the data server 3 of the user. For example, the application 10 transmits an authentication request where application-related information and redirection information have been specified to the data server 3 of the user. The application-related information here is a URL of the application server 2 corresponding to the application 10, and the redirection information is a URL of a token retrieval page on the application server 2 (a redirection URL). The URL of the application server 2 and the URL of the token retrieval page on the application server 2 are embedded in a predetermined area of the application 10.

Moreover, the application 10 acquires a token as a response to the authentication request from the browser 11, which is described below. Consequently, the application 10 can access the data server 3 of the user with the token.

The browser 11 is software to download predetermined information, analyze its layout, and display the information. For example, the browser 11 acquires a screen for inquiring of the user about the authentication request from the data server 3 to which the authentication request has been transmitted, and displays the acquired screen. Furthermore, the browser 11 acquires identification information of the application 10 (app identification information to be described below) from the URL of the application server 2, and displays the acquired app identification information on the screen for inquiring the authentication request. Consequently, the browser 11 displays the app identification information of the application 10 and accordingly can relegate the legitimacy of the application 10 to the user. In other words, the user visually confirms the app identification information displayed by the browser 11 and accordingly can determine the legitimacy of the application 10. Moreover, the browser 11 acquires a response to the authentication request from the data server 3 and downloads a token retrieval page 212 from the URL of the token retrieval page on the application server 2 contained in the acquired response. The browser 11 then executes the downloaded token retrieval page and checks whether or not a token can be retrieved. If the token can be retrieved, then the browser 11 returns to the application 10 the retrieved token as a response to the authentication request.

The application server 2 is divided in accordance with each service, in other words, each application to implement a service. Furthermore, the application server 2 includes a storage unit 21 and a presentation unit 22.

The storage unit 21 corresponds to, for example, a non-volatile semiconductor memory device or the like such as flash memory (Flash Memory), FRAM (registered trademark) (Ferroelectric Random Access Memory), or a storage device such as a hard disk (HDD). The storage unit 21 includes an application 210, app identification information 211, and the token retrieval page 212. The application 210 is software that provides a service, and is distributed to the communication terminal 1 at the request of the communication terminal 1. The token retrieval page 212 is a script used when a token is retrieved on the communication terminal 1 side.

Figure 2:
FIG. 2 is a diagram illustrating an example of the content of app identification information.

The app identification information 211 is information used for the identification of the application 210. The content of the app identification information 211 will be described here with reference to FIG. 2. FIG. 2 is a diagram illustrating an example of the content of the app identification information. As illustrated in FIG. 2, a logo a1, an app name a2, and a description a3 are associated and set in the app identification information. The logo a1 represents a logo of the application 210. The logo a1 may contain, for example, the name of a company that created the application 210 and the service name of a service provided by the application 210. The app name a2 represents the name of the application 210. The app name a2 may contain version information. A description of the function and the like of the application 210 is set in the description a3.

Return to FIG. 1. If the presentation unit 22 receives from the browser 11 an acquisition request for the app identification information 211 corresponding to its own application server 2, the presentation unit 22 presents the app identification information 211 stored in the storage unit 21 to the browser 11. Consequently, the browser 11 can display the app identification information 211 of the application 10 that has requested authentication, which enables the user to judge the legitimacy of the application 10.

The data server 3 is divided in user units of the communication terminal 1. Furthermore, the data server 3 includes a storage unit 31, an authentication unit 32, and a control unit 33.

The storage unit 31 corresponds to, for example, a nonvolatile semiconductor memory device or the like such as flash memory (Flash Memory), FRAM (registered trademark) (Ferroelectric Random Access Memory), or a storage device such as a hard disk. The storage unit 31 includes a data area corresponding to a service. The service referred to here indicates a service that is provided by the application server 2 and implemented by the application 10. For example, it is assumed that the communication terminal 1 of a user 100 receives service provision by the application 10 of a service A. If the authentication of the application 10 of the service A is successful, then the communication terminal 1 of the user 100 can access a data area corresponding to the service A in a storage area of the data server 3 corresponding to the user 100.

If receiving the authentication request where the application-related information and the redirection information have been specified from the application 10 running on the communication terminal 1, the authentication unit 32 starts the authentication of the application 10. The application-related information here is the URL of the application server 2 corresponding to the application 10. The redirection information is the URL of the token retrieval page on the application server 2. For example, the authentication unit 32 transmits to the communication terminal 1 the screen for inquiring of the user about the authentication request as a response to the authentication request from the application 10.

Moreover, the authentication unit 32 determines whether or not the redirection information is legitimate. For example, if the communication terminal 1 logs in to the data server 3 as a result of having inquired of the user about the authentication request, the authentication unit 32 determines whether or not the redirection information is subordinate to the application-related information. In other words, the authentication unit 32 determines whether or not a substring in the URL of the token retrieval page on the application server 2 is included in a string in the URL of the application server 2 corresponding to the application 10. As an example, if the substring is the string of the domain, the authentication unit 32 determines whether or not the string of the domain in the URL of the token retrieval page is included in the string in the URL of the application server 2. If determining that the redirection information is subordinate to the application-related information, then the authentication unit 32 judges that the redirection information is legitimate. On the other hand, if determining that the redirection information is not subordinate to the application-related information, the authentication unit 32 judges that the redirection information is illegitimate. Consequently, the authentication unit 32 can verify that the authentication request was made from the illegitimate application 10.

Moreover, if the redirection information is legitimate, the authentication unit 32 issues a token, assigns the issued token to the redirection information, and returns to the browser 11 the redirection information as a response to the authentication request. For example, the authentication unit 32 assigns the issued token with a fragment to the URL of the token retrieval page on the application server 2. The authentication unit 32 then specifies the assigned and obtained information as a location header and returns the information to the browser 11. An example of the information specified as the location header will be described here. It is assumed that the URL of the token retrieval page on the application server 2 is "https://hoge.example.com/{token_parse_script}." Then, the information to which the token has been assigned with the fragment is "https://hoge.example.com/{token_parse_script}#{token}." Furthermore, the specified location header is "Location:https://hoge.example.com/{token_parse_script}#{to ken}." Consequently, if the location header is received on the communication terminal 1 side, redirection is performed automatically. If retrieving the token, then the communication terminal 1 is enabled by the retrieved token to access an access destination of data corresponding to a service to be implemented by the application 10.

The control unit 33 controls access to the data by the application 10 of the communication terminal 1 based on the token received from the communication terminal 1.

Procedure for Process on Communication Terminal Side

Figure 3:
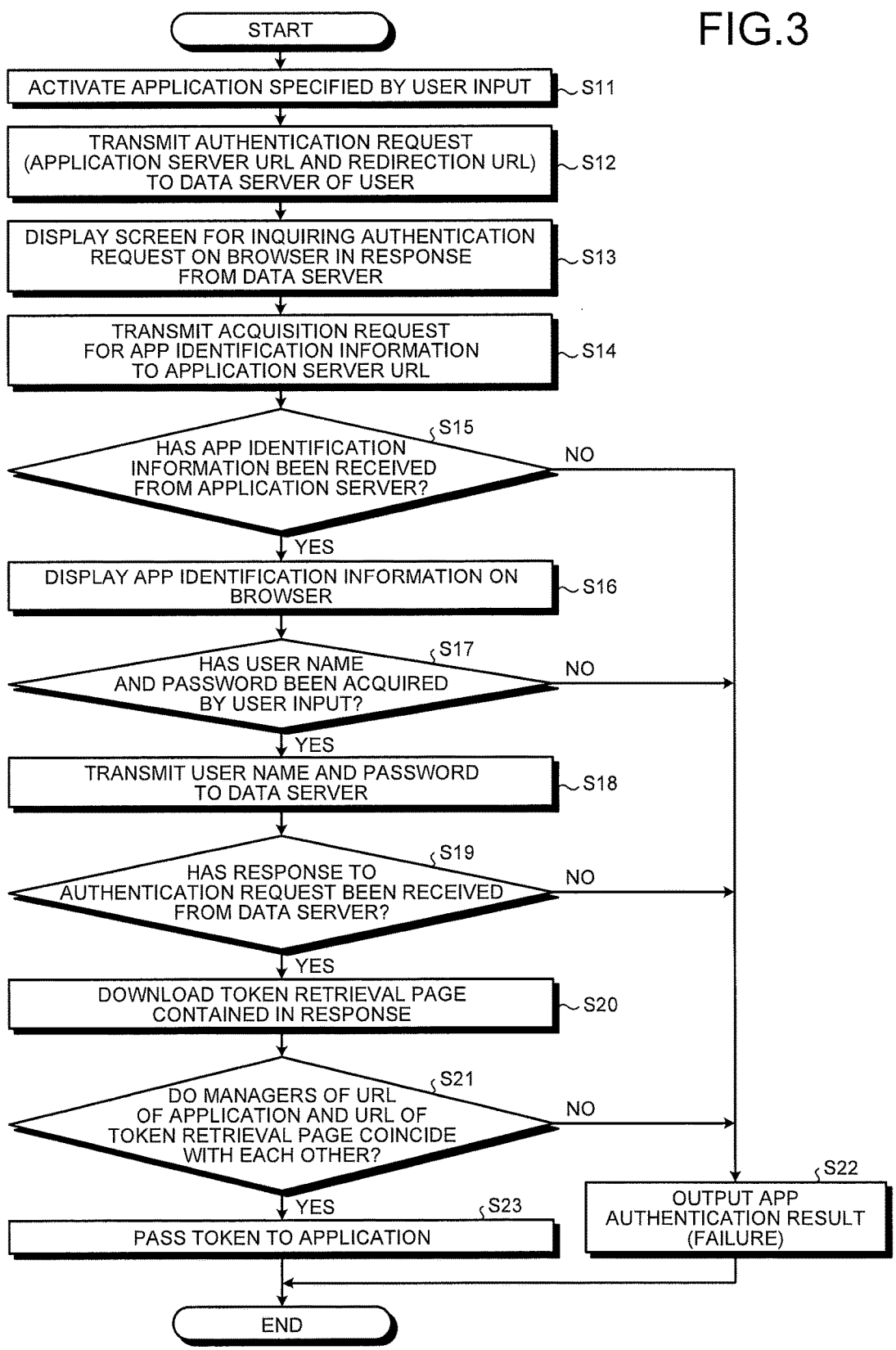
FIG. 3 is a diagram illustrating a flowchart of a process on a communication terminal side according to the embodiment.

Next, a procedure for a process on the communication terminal 1 side will be described with reference to FIG. 3. FIG. 3 is a diagram illustrating a flowchart of the process on the communication terminal side according to the embodiment. It is assumed that the application 10 that implements the service A is authenticated in the communication terminal 1.

Firstly, the communication terminal 1 activates the application 10 specified by user input (Step S11). The application 10 then transmits its own authentication request to the data server 3 of the user (Step S12). For example, the application 10 transmits to the data server 3 of the user the URL of the application server 2 corresponding to the application 10 and the URL of a token retrieval page on the application server 2 (a redirection URL). The URL of the application server 2 and the redirection URL are embedded in a predetermined area of the application 10.

Next, the browser 11 displays the screen for inquiring the authentication request in response from the data server 3 (Step S13). The browser 11 then transmits an acquisition request for the app identification information 211 corresponding to the application 10 to the URL of the application server 2 (Step S14).

The browser 11 subsequently determines whether or not to have received the app identification information 211 corresponding to the application 10 from the application server 2 (Step S15). If determining to have not received the app identification information 211 corresponding to the application 10 (Step S15; No), the browser 11 transits to Step S22 to cause the authentication result indicating that the app authentication ended in failure to be output.

On the other hand, if determining to have received the app identification information 211 corresponding to the application 10 (Step S15; Yes), the browser 11 displays the received app identification information 211 on the screen for inquiring the authentication request (Step S16). Consequently, the browser 11 displays the app identification information of the application 10 and accordingly can relegate the legitimacy of the application 10 to the user. In other words, the user visually confirms the app identification information displayed by the browser 11 and accordingly can determine the legitimacy of the application 10.

Next, the browser 11 determines whether or not to have acquired a user name and password by user input (Step S17). In other words, the browser 11 determines whether or not that the user has logged in to the data server 3. If determining to have not acquired the user name and password (Step S17;

No), the browser 11 transits to Step S22 to cause the authentication result indicating that the app authentication ended in failure to be output.

On the other hand, if determining to have acquired the user name and password (Step S17; Yes), the browser 11 transmits the user name and password to the data server 3 of the user (Step S18).

The browser 11 subsequently determines whether or not to have received a response to the authentication request from the data server 3 (Step S19). If determining to have not received the response to the authentication request (Step S19; No), the browser 11 transits to Step S22 to cause the authentication result indicating that the app authentication ended in failure to be output.

On the other hand, if determining to have received the response to the authentication request (Step S19; Yes), the browser 11 downloads the token retrieval page from the URL of the token retrieval page on the application server 2, which is contained in the response (Step S20). The response to the authentication request is specified, for example, as the location header. As an example, it is assumed that the response specified as a location header is "Location:https://hoge.example.com/{token_parse_script}#{to ken}." The browser 11 downloads the token retrieval page from "https://hoge.example.com/{token_parse_script}."

The browser 11 then executes the downloaded token retrieval page and checks whether or not the token can be retrieved (Step S21).

Specifically, the browser 11 determines whether or not the managers of the URL of the application and the URL of the token retrieval page coincide with each other when executing the token retrieval page contained in the response. As a method for determining whether or not the managers coincide with each other, for example, it is determined whether or not the URL of the token retrieval page passed as the response is in a relationship of being located in the same or a subordinate layer as or to the URL of the application, by analyzing the strings of the URLs. Alternatively, it may be determined whether or not the domains coincide with each other by checking with the function of the browser 11 whether or not the script included in the page display corresponding to the URL of the token retrieval page can be executed from the page display corresponding to the URL of the application. If determining that the managers of the URL of the token retrieval page corresponding to the redirection URL of the authentication request and the URL of the application coincide with each other (Step S21; Yes), the browser 11 can acquire the token from the token retrieval page. Consequently, the authentication of the application 10 is complete, and then the browser 11 passes the token to the application 10 (Step S23). The application 10 may output the authentication result indicating that the app authentication was successful to, for example, a monitor. The process on the communication terminal 1 side then ends.

On the other hand, if determining that the managers of the URL of the token retrieval page contained in the response and the URL of the application do not coincide with each other (Step S21; No), the browser 11 does not pass the token to the application 10. In response to this, the application 10 transits to Step S22 to cause the authentication result indicating that the app authentication ended in failure to be output. For example, if the application 10 does not receive the token even after a lapse of a fixed time, or if the application 10 receives a notice of the authentication failure from the browser 11, the application 10 transits to Step S22. In Step S22, the communication terminal 1 outputs the authentication result indicating that the app authentication ended in failure to, for example, the monitor (Step S22). The process on the communication terminal 1 side then ends.

Procedure for Process on Data Server Side

Figure 4:
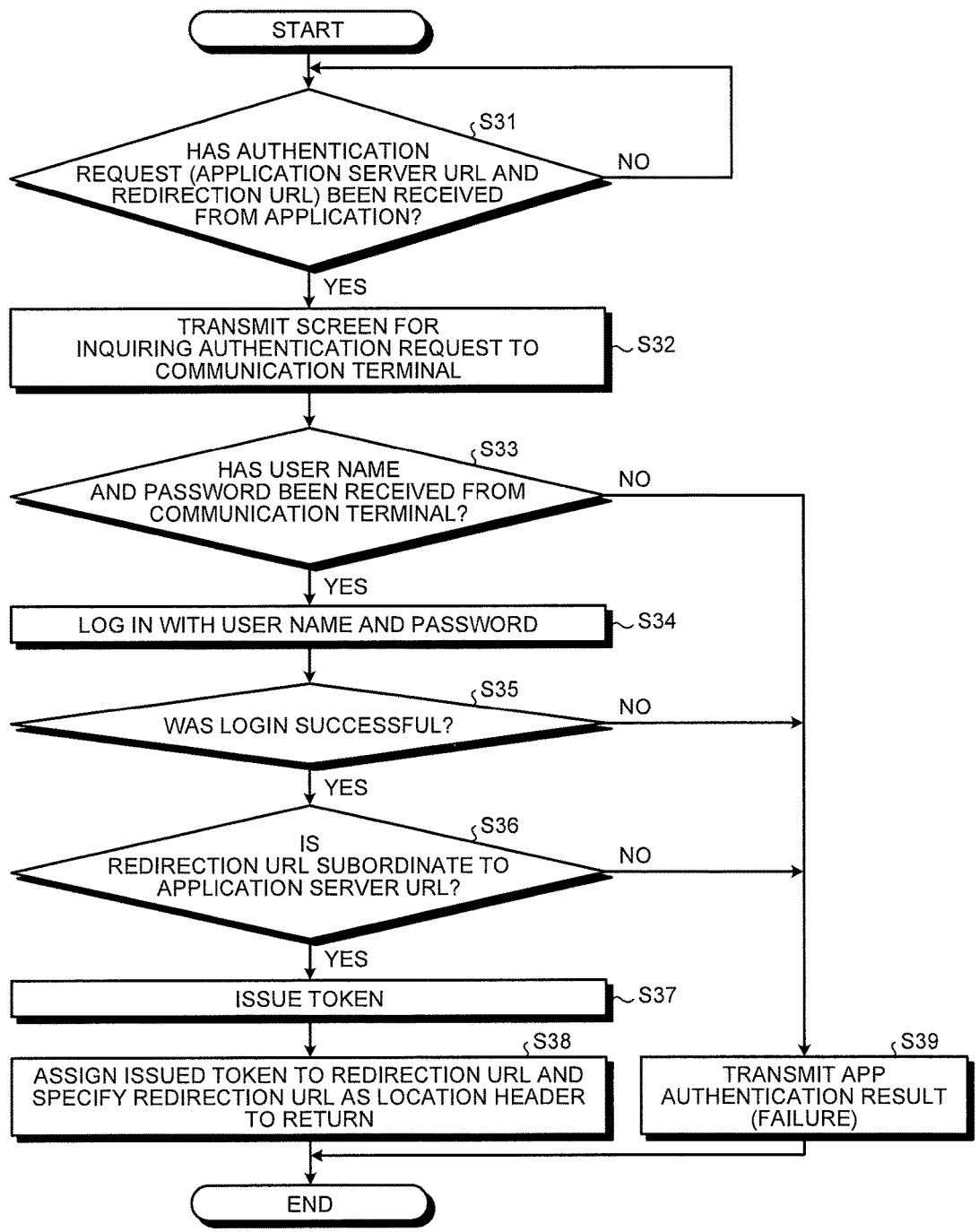
FIG. 4 is a diagram illustrating a flowchart of a process on a data server side according to the embodiment.

Next, a procedure for a process on the data server 3 side will be described with reference to FIG. 4. FIG. 4 is a diagram illustrating a flowchart of the process on the data server side according to the embodiment. It is assumed that an authentication request of the application 10 that implements the service A is transmitted from the communication terminal 1.

Firstly, the authentication unit 32 determines whether or not to have received the authentication request from the application (Step S31). The authentication request contains the URL of the application server 2 corresponding to the application and the URL of the token retrieval page on the application server 2 (the redirection URL). If determining to have not received the authentication request from the application (Step S31; No), the authentication unit 32 repeats the determination process until receiving the authentication request.

On the other hand, if determining to have received the authentication request from the application (Step S31; Yes), the authentication unit 32 transmits the screen for inquiring the authentication request to the communication terminal 1 (Step S32). It is assumed here that the authentication unit 32 has received the authentication request from the application 10.

The authentication unit 32 subsequently determines whether or not to have received a user name and password from the communication terminal 1 (Step S33). If determining to have not received the user name and password from the communication terminal 1 (Step S33; No), the authentication unit 32 transits to Step S39 to cause the authentication result indicating that the app authentication ended in failure to be transmitted.

On the other hand, if determining to have received the user name and password from the communication terminal 1 (Step S33; Yes), the authentication unit 32 attempts to log in to its own data server 3 using the user name and password (Step S34). The authentication unit 32 determines whether or not the login was successful (Step S35). If determining to have failed in the login (Step S35; No), the authentication unit 32 transits to Step S39 to cause the authentication result indicating that the app authentication ended in failure to be transmitted.

On the other hand, if determining that the login was successful (Step S35; Yes), the authentication unit 32 determines whether or not the redirection URL is subordinate to the URL of the application server 2 (Step S36). For example, the authentication unit 32 determines whether or not a substring in a string of the redirection URL is included in a string of the URL of the application server 2. If determining that the redirection URL is not subordinate to the URL of the application server 2 (Step S36; No), the authentication unit 32 transits to Step S39 to cause the authentication result indicating that the app authentication ended in failure to be transmitted. Consequently, the authentication unit 32 can verify that the authentication request was made from the illegitimate application 10.

In Step S39, the authentication unit 32 transmits the authentication result indicating that the app authentication ended in failure to the communication terminal 1 that had requested authentication (Step S39). The process on the data server side then ends.

On the other hand, if determining that the redirection URL is subordinate to the URL of the application server 2 (Step S36; Yes), the authentication unit 32 issues a token (Step S37). The authentication unit 32 then assigns the issued token with a fragment to the redirection URL. The authentication unit 32 then specifies the assigned and obtained information as a location header and returns the information to the browser 11 (Step S38). The process on the data server side then ends.

Procedure for Process on Application Server Side

Figure 5:
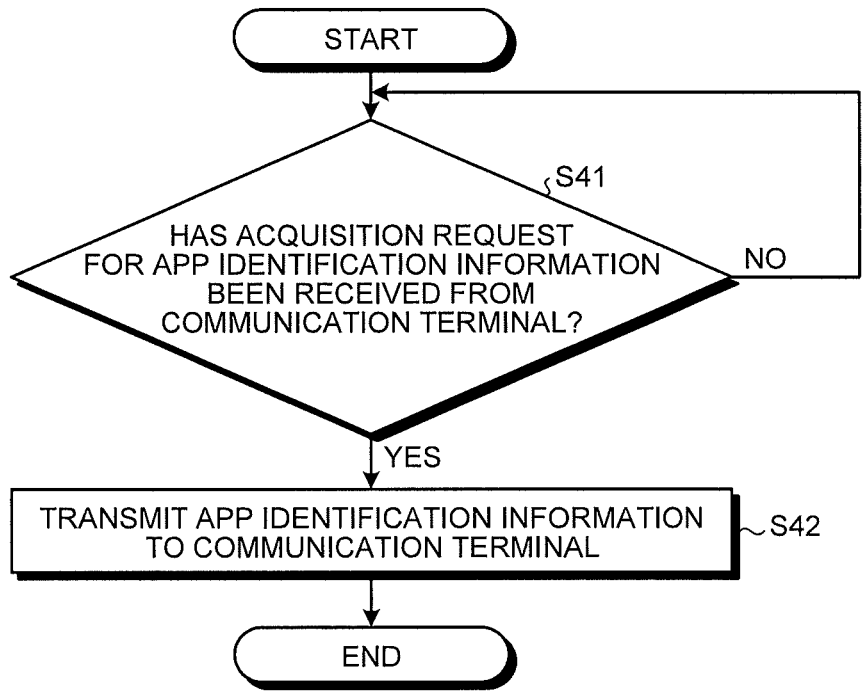
FIG. 5 is a diagram illustrating a flowchart of a process on an application server side according to the embodiment.

Next, a procedure for a process on the application server 2 side will be described with reference to FIG. 5. FIG. 5 is a diagram illustrating a flowchart of the process on the application server side according to the embodiment. It is assumed that the communication terminal 1 has requested the authentication of the application 10 that implements the service A.

Firstly, the presentation unit 22 determines whether or not to have received an acquisition request for the app identification information 211 from the communication terminal 1 (Step S41). If determining to have not received the acquisition request for the app identification information 211 from the communication terminal 1 (Step S41; No), the presentation unit 22 repeats the determination process until receiving the acquisition request for the app identification information 211.

On the other hand, if determining to have received the acquisition request for the app identification information 211 from the communication terminal 1 (Step S41; Yes), the presentation unit 22 transmits the app identification information 211 to the communication terminal 1 (Step S42). In other words, the presentation unit 22 of the application server 2 corresponding to the URL of the application server 2, the URL having been specified in the authentication request, transmits to the communication terminal 1 the app identification information 211 stored in its own storage unit 21. Consequently, the presentation unit 22 can present the app identification information 211 to the communication terminal 1, which enables the user of the communication terminal 1 to judge the legitimacy of the application 10. The process on the application server 2 side then ends.

Sequence of Application Authentication Process

Next, a sequence of the application authentication process will be described with reference to FIG. 6. FIG. 6 is a diagram illustrating the sequence of the application authentication process according to the embodiment. It is assumed in FIG. 6 that the communication terminal 1 of a user U requests authentication of an application A. The application A provides the service A.

If the user U activates the application A of the communication terminal 1 (Step S91), the activated application A transmits an authentication request to the data server 3 of the user U (Step S92). The URL of the application server 2 and the URL of the token retrieval page on the application server 2 (the redirection URL) are specified in the authentication request.

On the user U's data server 3 side, the authentication unit 32, which has received the authentication request, transmits the screen for inquiring the authentication request to the communication terminal 1 (Step S93). As a consequence, the browser 11 displays the screen for inquiring the authentication request on the communication terminal 1 side. The browser 11 then transmits an acquisition request for the app identification information 211 to the URL of the application server 2, the URL having been specified in the authentication request (Step S94). It is assumed here that the URL of the application server 2 is the application server 2 corresponding to the service A.

On the application server 2 side corresponding to the service A, the presentation unit 22, which has received the acquisition request for the app identification information 211, transmits the app identification information 211 stored in its own storage unit 21 to the communication terminal 1 being the acquisition request source (Step S95). As a consequence, the browser 11 displays the app identification information 211 on the screen for inquiring the authentication request on the communication terminal 1 side. The app identification information 211 of the application A is displayed on the screen for inquiring the authentication request on the browser 11. In other words, the logo of the application A, the name of the application A, and the description of the application A are displayed.

If judging that the displayed app identification information 211 is legitimate information corresponding to the application A, the user U inputs the user's authentication information in the browser 11 and logs in to the data server 3. It is assumed here that the user U judges that the displayed app identification information 211 is legitimate information corresponding to the application A and inputs his/her user name and password as the user's authentication information (Step S96). The browser 11 then transmits the input user name and password to the data server 3 of the user U (Step S97).

The authentication unit 32, which has received the user name and password, logs in with the user name and password on the user U's data server 3 side. If the login was successful and the redirection URL is subordinate to the URL of the application server 2, then the authentication unit 32 issues a token. The authentication unit 32 then assigns the issued token with a fragment to the URL of the token retrieval page on the application server 2 being the redirection URL. The authentication unit 32 then specifies the assigned and obtained information as a location header and returns the information as a response to the authentication request to the browser 11 of the communication terminal 1 (Step S98).

The browser 11 of the communication terminal 1 downloads the token retrieval page 212 from the URL of the token retrieval page on the application server 2 contained in the response (Step S99). The browser 11 then executes the downloaded token retrieval page and checks whether or not the token can be retrieved. If the token can be retrieved, then the browser 11 returns the retrieved token as a response to the authentication request to the application A (Step S100).

If receiving the token as the response to the authentication request from the browser 11, the application A of the communication terminal 1 can access the data server 3 of the user U with the token.

In the embodiment, the browser 11 is set so as to acquire, from the URL of the application server 2 specified in the authentication request, the app identification information 211 corresponding to the URL of the above application server 2. However, the embodiment is not limited to this, but may be a case where the data server 3 acquires, from the URL of the application server 2 specified by the authentication request, the app identification information 211 corresponding to the URL of the above application server 2. In such a case, the data server 3 transmits the acquired app identification information 211 and the screen for inquiring of the user about the authentication request to the browser 11 of the communication terminal 1.

Hence, a description will be given of the case where the data server 3 acquires, from the URL of the application server 2 specified by the authentication request, the app identification information 211 corresponding to the URL of the above application server 2 as a modification of the application authentication process.

Sequence of Modification of Application Authentication Process

FIG. 7 is a diagram illustrating a sequence of the modification of the application authentication process according to the embodiment. In FIG. 7, the same reference numerals are assigned to the same operations as the sequence of the application authentication process illustrated in FIG. 6 and the overlapping operations will be described briefly. It is also assumed in FIG. 7 that the communication terminal 1 of the user U requests the authentication of the application A as in FIG. 6. The application A provides the service A.

The user U activates the application A of the communication terminal 1 (Step S91). The activated application A transmits an authentication request to the data server 3 of the user U (Step S92). The URL of the application server 2 and the URL of the token retrieval page on the application server 2 (the redirection URL) are specified in the authentication request.

On the user U's data server 3 side, the authentication unit 32, which has received the authentication request, transmits an acquisition request for the app identification information 211 to the URL of the application server 2 specified in the authentication request (Step S93A). It is assumed here that the URL of the application server 2 is the application server 2 corresponding to the service A.

On the application server 2 side corresponding to the service A, the presentation unit 22, which has received the acquisition request for the app identification information 211, transmits the app identification information 211 stored in its own storage unit 21 to the data server 3 of the user U being the acquisition request source (Step S93B). On the user U's data server 3 side, the authentication unit 32, which has acquired the app identification information 211, transmits to the communication terminal 1 the app identification information 211 and the screen for inquiring the authentication request (Step S93C).

As a consequence, on the communication terminal 1 side, the browser 11 displays the app identification information 211 on the screen for inquiring the authentication request. The app identification information 211 of the application A is displayed on the screen for inquiring the authentication request on the browser 11. In other words, the logo of the application A, the name of the application A, and the description of the application A are displayed.

It is assumed here that the user U judges that the displayed app identification information 211 is legitimate information corresponding to the application A and inputs his/her user name and password as the user's authentication information (Step S96). The browser 11 then transmits the input user name and password to the data server 3 of the user U (Step S97).

On the user U's data server 3 side, the authentication unit 32, which has received the user name and password, logs in using the user name and password. If the login was successful and the redirection URL is subordinate to the URL of the application server 2, then the authentication unit 32 issues a token. The authentication unit 32 then assigns the issued token with a fragment to the URL of the token retrieval page on the application server 2 being the redirection URL. The authentication unit 32 then specifies the assigned and obtained information as a location header and returns the information as a response to the authentication request to the browser 11 of the communication terminal 1 (Step S98).

The browser 11 of the communication terminal 1 downloads the token retrieval page 212 from the URL of the token retrieval page on the application server 2, the URL being contained in the response (Step S99). The browser 11 then executes the downloaded token retrieval page and checks whether or not the token can be retrieved. If the token can be retrieved, then the browser 11 returns the retrieved token as a response to the authentication request to the application A (Step S100).

If receiving the token as the response to the authentication request from the browser 11, the application A of the communication terminal 1 can access the data server 3 of the user U with the token.

App Authentication Process

Figure 8A:
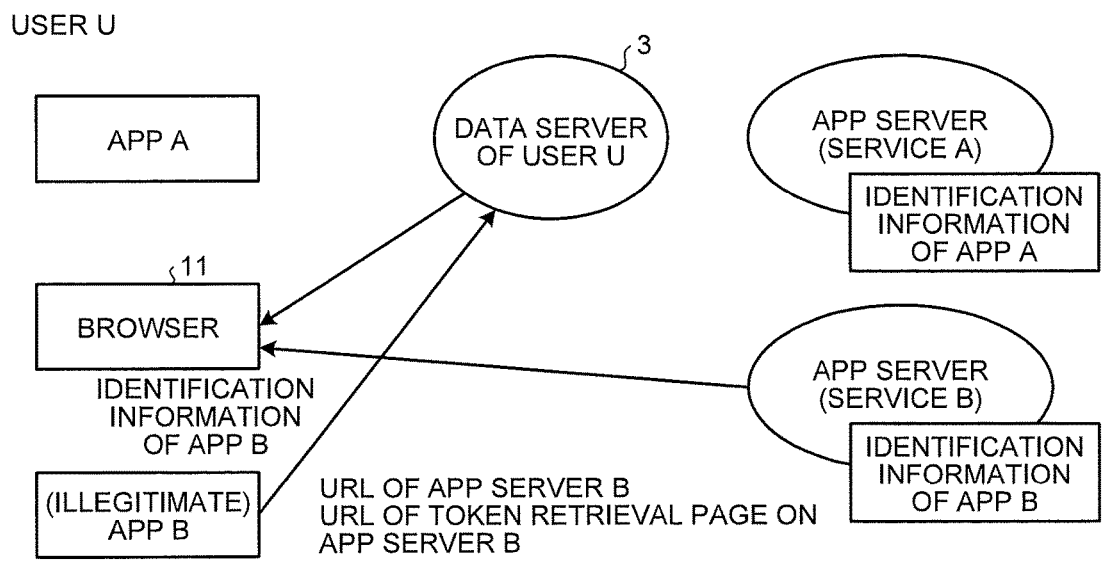
FIG. 8A is a diagram (1) illustrating an example where an illegitimate application requests authentication.
Figure 8B:
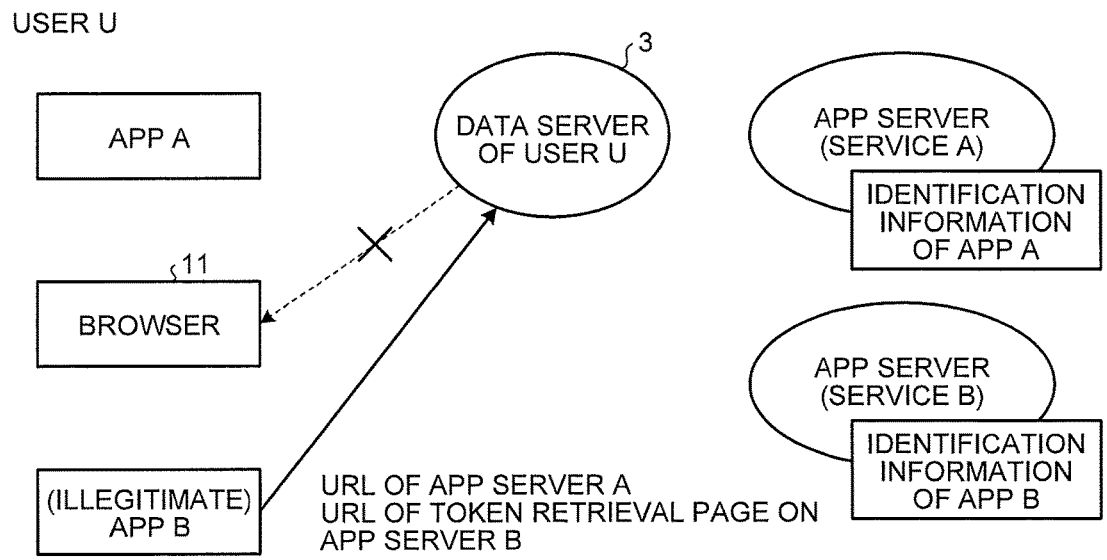
FIG. 8B is a diagram (2) illustrating an example where the illegitimate application requests authentication.
Figure 8C:
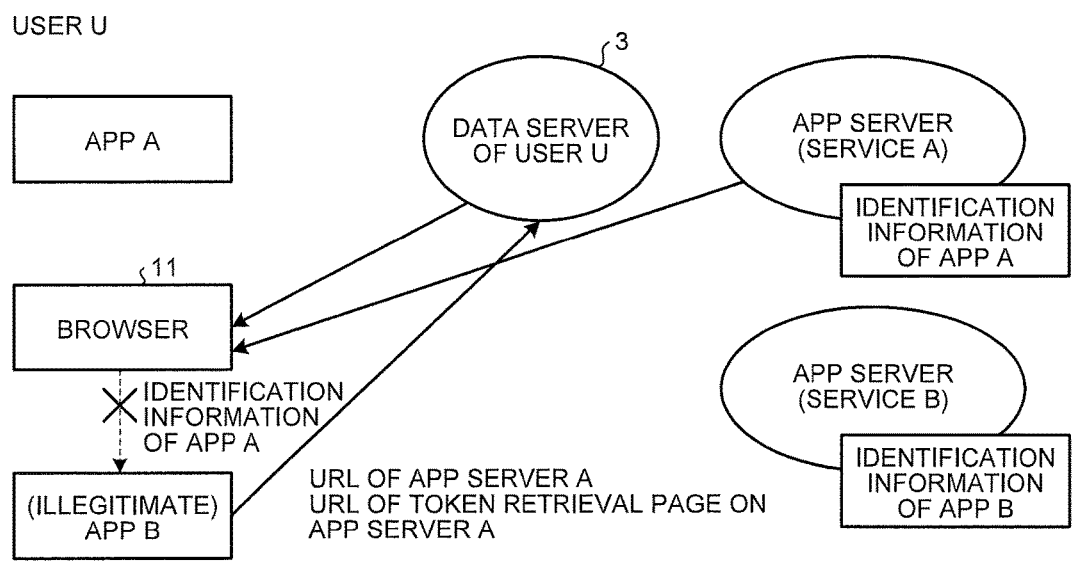
FIG. 8C is a diagram (3) illustrating an example where the illegitimate application requests authentication.

Next, a case where an illegitimate application requests authentication will be described with reference to FIGS. 8A to 8C. FIGS. 8A to 8C are diagrams illustrating examples where an illegitimate application requests authentication. In FIGS. 8A to 8C, an application is abbreviated to "app" and an application server to "app server." Moreover, it is assumed that an app B is an illegitimate application, and attempts to access a storage area of the service A corresponding to a legitimate app A spoofing the app A.

As illustrated in FIG. 8A, the app B transmits an authentication request to the data server 3 of the user U. The URL of an app server corresponding to a service B that is implemented by the app B (hereinafter referred to as the app server B) and the URL of a token retrieval page on the app server B (a redirection URL) are specified in the authentication request.

In such a case, the data server 3 of the user U transmits the screen for inquiring the authentication request to the communication terminal 1, and the browser 11 displays the screen for inquiring the authentication request. The browser 11 then acquires the app identification information 211 from the URL of the app server B specified in the authentication request and displays the acquired app identification information 211. The app identification information 211 here is the identification information of the app B. In other words, the browser 11 displays the identification information of the app B. Consequently, the user U visually confirms the displayed identification information of the app B and accordingly can determine that the illegitimate app B is running. As a consequence, the application authentication process can avoid access by the app B to the storage area of the service A corresponding to the app A.

As illustrated in FIG. 8B, the app B transmits an authentication request to the data server 3 of the user U. The URL of an app server corresponding to the service A that is implemented by the app A (hereinafter referred to as the app server A) and the URL of the token retrieval page on the app server B (the redirection URL) are specified in the authentication request.

In such a case, if the redirection URL is subordinate to the URL of the app server A, the data server 3 of the user U issues a token and returns to the browser 11 information to which the issued token has been assigned with a fragment to the redirection URL. However, the redirection URL is the URL of the token retrieval page on the app server B and accordingly, the redirection URL is not subordinate to the URL of the app server A. Consequently, the data server 3 does not return the response to the browser 11 and accordingly can avoid subsequent access by the app B to the storage area of the service A corresponding to the app A.

As illustrated in FIG. 8C, the app B transmits an authentication request to the data server 3 of the user U. The URL of the app server A corresponding to the service A that is implemented by the app A and the URL of a token retrieval page on the app server A (a redirection URL) are specified in the authentication request.

In such a case, the data server 3 of the user U transmits the screen for inquiring the authentication request to the communication terminal 1, and the browser 11 displays the screen for inquiring the authentication request. The browser 11 then acquires the app identification information 211 from the URL of the app server A specified in the authentication request and displays the acquired app identification information 211. The app identification information 211 here is the identification information of the app A. In other words, the browser 11 displays the identification information of the app A.

It is assumed that the user U visually confirms the displayed identification information of the app A and logs in to the data server 3 of the user U. The redirection URL is subordinate to the URL of the app server A. Accordingly, the data server 3 of the user U issues a token. The data server 3 then assigns the issued token with a fragment to the URL of the token retrieval page on the app server A being the redirection URL. The data server 3 then specifies the assigned and obtained information as a location header and returns the information as a response to the authentication request to the browser 11.

The browser 11 downloads the token retrieval page 212 from the URL of the token retrieval page on the app server A contained in the response. The browser 11 then executes the downloaded token retrieval page and checks whether or not the token can be retrieved. For example, the browser 11 determines whether or not the URL of the token retrieval page passed as the response is in a relationship of being located in the same or a subordinate layer as or to the URL of the application, by analyzing the scripts of the URLs. The URL of the app server A is in the relationship of being located in the same or subordinate layer as or to the URL of the token retrieval page on the app server A and accordingly it is confirmed that a token can be retrieved. However, even if the token is retrieved, the browser 11 is to pass the retrieved token as a response to the authentication request to the app A. Consequently, a delivery destination of the response to the authentication request is not the app B. Therefore, the app B does not access the storage area of the service A corresponding to the app A. In other words, the application authentication process can avoid access by the app B to the storage area of the service A corresponding to the app A.

In this manner, even in any case of FIGS. 8A to 8C, the application authentication process can avoid access by the illegitimate app B to the storage area of the service A corresponding to the app A.

The authentication unit 32 determines whether or not the redirection information is subordinate to the application-related information. In the embodiment, the description has been given in which the authentication unit 32 determines whether or not the substring in the URL of the token retrieval page on the application server 2 is included in the string in the URL of the application server 2 corresponding to the application 10. However, the authentication unit 32 is not limited to this but may be set so as to inquire of another server whether or not the redirection information is subordinate to the application-related information. In such a case, the authentication unit 32 passes to the other server the URL of the token retrieval page on the application server 2 and the URL of the application server 2 corresponding to the application 10. The other server then determines whether or not the URL of the token retrieval page on the application server 2 is subordinate of the URL of the application server 2 corresponding to the application 10 and returns the determination result to the authentication unit 32. Consequently, the authentication unit 32 can detect the URL of an illegal token retrieval page from the relationship between the redirection information and the application-related information specified in the authentication request.

Moreover, the description has been given in which if the communication terminal 1 logs in to the data server 3, the authentication unit 32 determines whether or not the redirection information is subordinate to the application-related information. However, the authentication unit 32 is not limited to this but receives an authentication request where the redirection information and the application-related information have been specified from the application 10 running on the communication terminal 1. The authentication unit 32 may determine whether or not the redirection information specified in the authentication request is subordinate to the application-related information specified in the authentication request. Consequently, the authentication unit 32 can detect illegitimate redirection information early at an early stage from the relationship between the redirection information and the application-related information.

Effects of Embodiment

According to the embodiment, the authentication unit 32 accepts an authentication request containing the URL of the application server 2 corresponding to the application 10 and the URL of the token retrieval page on the application server 2 from the application 10 running on the communication terminal 1. If judging that the URL of the token retrieval page is legitimate, then the authentication unit 32 transmits a response to the authentication request containing the app identification information 211 corresponding to the URL of the application server 2 to a redirection destination corresponding to the URL of the token retrieval page. According to such a configuration, the authentication unit 32 transmits the app identification information 211 to the redirection destination corresponding to the URL of the token retrieval page and accordingly can relegate a judgment about the legitimacy of the application 10 to a user at the redirection destination. As a consequence, the data reference system 9 can determine the legitimacy of the application 10 even if information on the authentication of the application is not registered with each data server 3.

Moreover, according to the embodiment, the authentication unit 32 transmits to the communication terminal 1 the app identification information 211 corresponding to the URL of the application server 2 as a response to the authentication request. If accepting the user's authentication information from the communication terminal 1, then the authentication unit 32 issues a token and transmits the issued token as the response to the authentication request to the redirection destination corresponding to the redirection information. According to such a configuration, the authentication unit 32 transmits the app identification information 211 as the response to the authentication request, subsequently transmits the token, and accordingly can determine the legitimacy of the application 10 in stages.

Moreover, according to the embodiment, if accepting the authentication request, the authentication unit 32 determines whether or not the redirection information is subordinate to the application-related information and accordingly judges the legitimacy of the redirection information. According to such a configuration, the authentication unit 32 can detect illegitimate redirection information. In other words, the authentication unit 32 can detect that the application 10, which has requested authentication, is not legitimate.

Moreover, according to the embodiment, the application 10 transmits to the data server 3 the authentication request containing the URL of the application server 2 corresponding to the application 10 and the URL of the token retrieval page on the application server 2. If receiving a response to the authentication request from the data server 3, then the browser 11 displays the app identification information 211 corresponding to the URL of the application server 2 contained in the response. If receiving the response to the authentication request from the data server 3, then the application 10 verifies the legitimacy of the response based on the redirection destination information of the response and the information contained in the authentication request. According to such a configuration, the browser 11 displays the app identification information 211 corresponding to the URL of the application server 2, which enables the user to judge the legitimacy of the application 10 corresponding to the URL of the application server 2. Moreover, with regard to the application 10, the legitimacy of the response is verified based on the redirection destination information of the response and the information contained in the authentication request. Accordingly, the legitimacy of the application that has instructed the authentication request leading to the response can be determined.

The application server 2 can be realized by incorporating the functions of the storage unit 21, the presentation unit 22, and the like in a known information processing apparatus such as a personal computer or a workstation. Moreover, the data server 3 can be realized by incorporating the functions of the storage unit 31, the authentication unit 32, and the like in a known information processing apparatus such as a personal computer or a workstation.

Moreover, the illustrated components of the apparatuses are not necessarily needed to be physically configured as illustrated. In other words, a specific aspect of the distribution/integration of each apparatus is not limited to the illustration, and all or part thereof can be configured by functional or physical distribution/integration in arbitrary units in accordance with various loads and use patterns, and the like. For example, the authentication unit 32 and the control unit 33 may be integrated as one unit. On the other hand, the authentication unit 32 may be distributed into a first authentication unit that determines the legitimacy of the redirection information and a second authentication unit that authenticates the legitimacy of a user. Moreover, the storage unit 21 may be connected as an external device of the application server 2 via the network 4.

Hardware Configuration of Server

Figure 9:
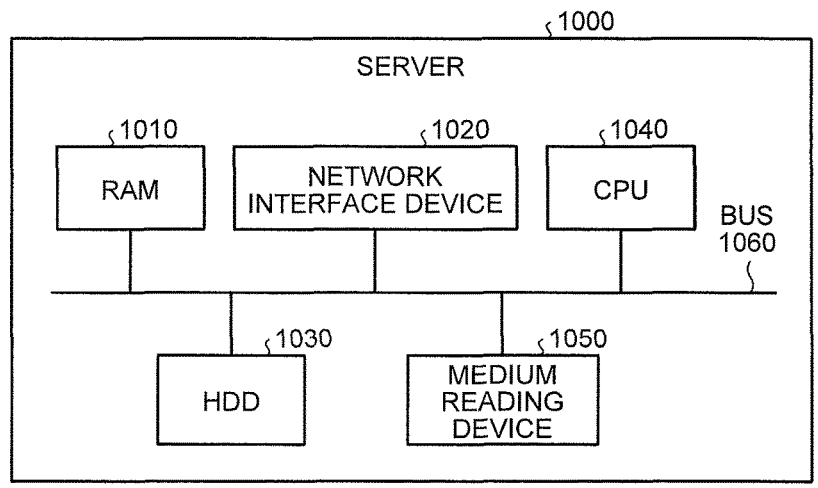
FIG. 9 is a diagram illustrating an example of a hardware configuration of a server.

FIG. 9 is a diagram illustrating an example of a hardware configuration of a server. The server referred to here indicates the application server 2 and the data server 3. As illustrated in FIG. 9, a server 1000 includes RAM 1010, a network interface device 1020, an HDD 1030, a CPU 1040, a medium reading device 1050, and a bus 1060. The RAM 1010, the network interface device 1020, the HDD 1030, the CPU 1040, and the medium reading device 1050 are connected by the bus 1060.

In a case of the data server 3, a program such as an application authentication program that realizes the functions of the authentication unit 32 and the control unit 33 illustrated in FIG. 1 is stored in the HDD 1030. Moreover, data corresponding to various services such as the services A and B stored in the storage unit 31 illustrated in FIG. 1 are stored in the HDD 1030. The CPU 1040 reads the application authentication program from the HDD 1030 and loads the application authentication program into the RAM 1010. Accordingly, the application authentication program functions as the application authentication process. The application authentication process loads information read from the HDD 1030, and the like into an area allocated to itself on the RAM 1010 as appropriate, and executes various data processes based on the loaded data and the like.

Moreover, in a case of the application server 2, a program such as the application authentication program that realizes the function of the presentation unit 22 illustrated in FIG. 1 is stored in the HDD 1030. Moreover, various data such as the application 210 and the app identification information 211 stored in the storage unit 21 illustrated in FIG. 1 are stored in the HDD 1030. The CPU 1040 reads the application authentication program from the HDD 1030 and loads the application authentication program into the RAM 1010. Accordingly, the application authentication program functions as the application authentication process. The application authentication process loads information read from the HDD 1030, and the like into an area allocated to itself on the RAM 1010 as appropriate, and executes various data processes based on the loaded data and the like.

The medium reading device 1050 reads a program such as the application authentication program from a medium to store the program, and the like even if the program such as the application authentication program is not stored in the HDD 1030. The medium reading device 1050 is, for example, a CD-ROM or an optical disk device.

The network interface device 1020 is a device that is connected to an external device via a network, and is a device that is compatible to wireless or wired.

Hardware Configuration of Communication Terminal

Figure 10:
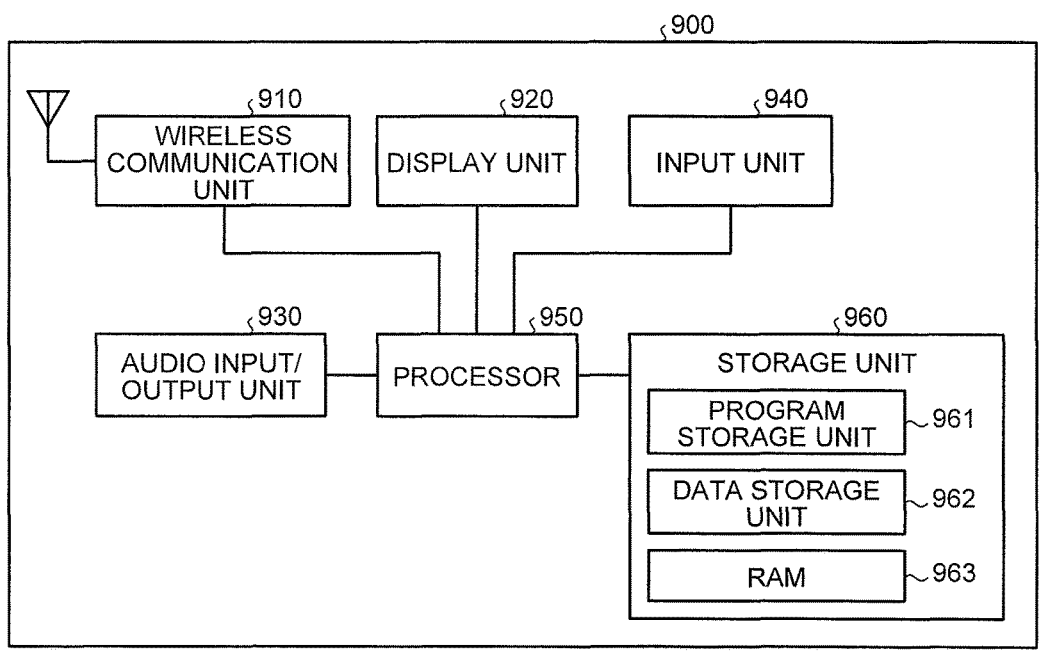
FIG. 10 is a diagram illustrating an example of a hardware configuration of a communication terminal.
Figure 11:
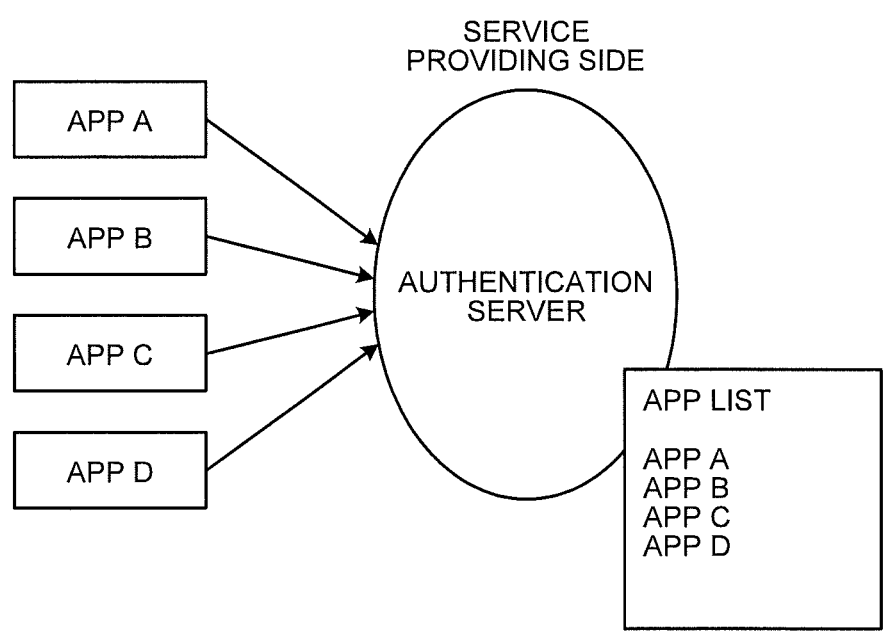
FIG. 11 is a diagram illustrating services using OAuth2.
Figure 12:
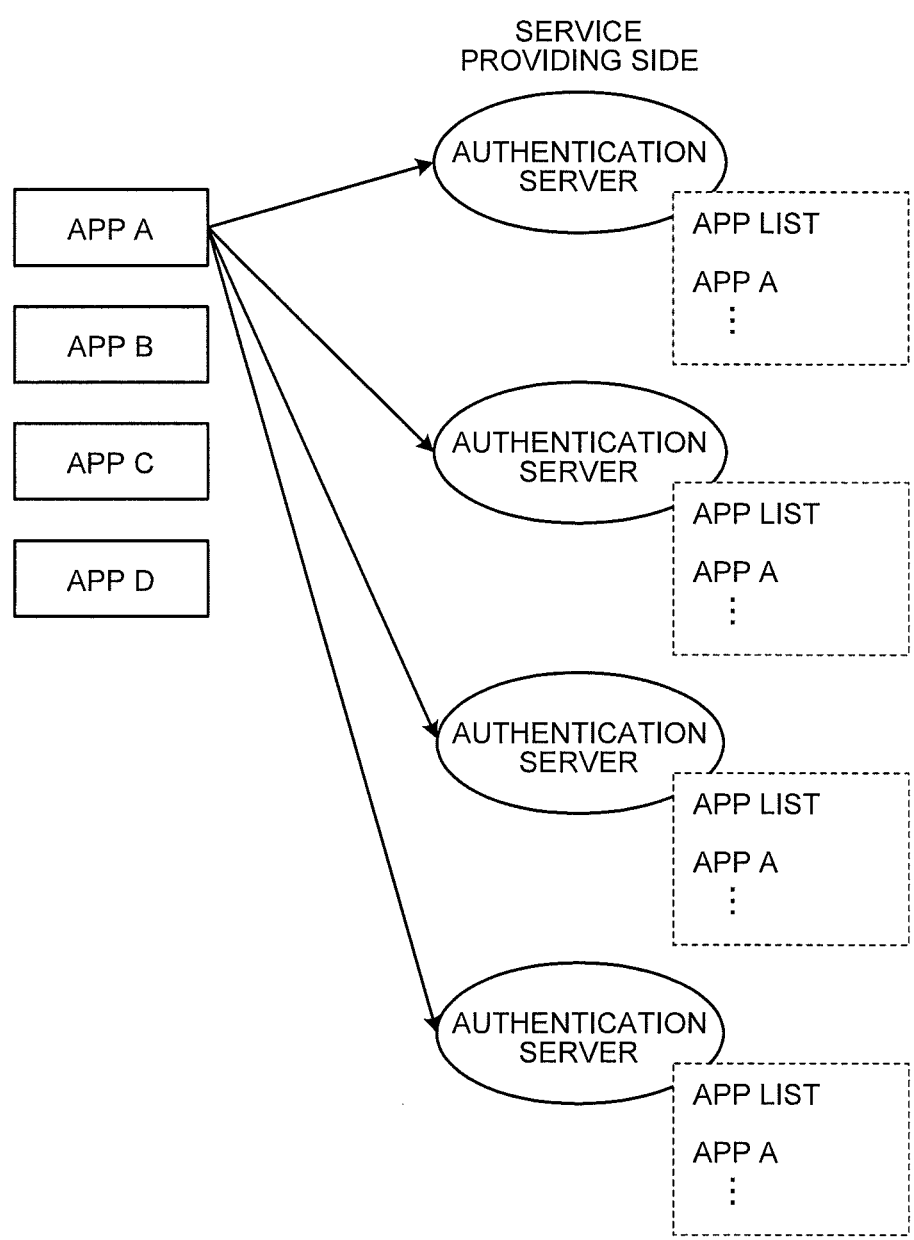
FIG. 12 is a diagram illustrating a problem that app authentication becomes complicated.

FIG. 10 is a diagram illustrating an example of a hardware configuration of a communication terminal. As illustrated in FIG. 10, a communication terminal 900 includes a wireless communication unit 910, a display unit 920, an audio input/output unit 930, an input unit 940, a processor 950, and a storage unit 960. The wireless communication unit 910, the display unit 920, the audio input/output unit 930, the input unit 940, and the storage unit 960 are respectively connected to the processor 950.

The storage unit 960 includes a program storage unit 961, a data storage unit 962, and RAM (Random Access Memory) 963. The application authentication program containing the application 10 and the browser 11, which are illustrated in FIG. 1, is stored in the program storage unit 961. Various data such as the screen for inquiring an authentication request and the app identification information 211, which are transmitted from the data server 3 and the application server 2, are stored in the data storage unit 962. The storage unit 960 is, for example, a semiconductor memory device such as RAM or flash memory (flash memory), or a storage device such as a hard disk (HDD: Hard Disk Drive) or an optical disk.

The processor 950 is, for example, an integrated circuit such as an ASIC (Application Specific Integrated Circuit) or an FPGA (Field Programmable Gate Array), or an electronic circuit such as a CPU (Central Processing Unit) or an MPU (Micro Processing Unit). The processor 950 reads the application authentication program from the storage unit 960 and loads the application authentication program into the RAM 963. Accordingly, the program such as the application authentication program functions as a process such as the application authentication process. The application authentication process then loads information read from the data storage unit 962, and the like into an area allocated to itself on the RAM 963 as appropriate, and executes various data processes based on the loaded data and the like.

The application authentication program may be stored in another computer (or server) connected to the server 1000 and the communication terminal 900 via a public network, the Internet, a LAN, a WAN (Wide Area Network), or the like. In this case, the server 1000 reads and executes the application authentication program from the other computer and the like via the network interface device 1020. The communication terminal 900 reads and executes the application authentication program from the other computer and the like via the wireless communication unit 910.

One aspect of the application authentication program disclosed in the present application can determine the legitimacy of an application.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium having stored therein a program for causing a computer to execute an application authentication process comprising:
   accepting an access request containing application-related information and redirection information stored in an application from the application executed on a terminal, the application-related information including a first URL (Uniform Resource Locator) of an application server corresponding to the application and the redirection information including a second URL of a token retrieval page on the application server;
   obtaining application identification information identifying the application from the application server and transmitting to the terminal an access response containing the obtained application identification information and an interface for inquiring an authentication request to cause the terminal to display the obtained application identification information and the interface on a display unit of the terminal, the application identification information being a logo of the application, a name of the application or a description of the application or any combination thereof; and
   when judging that a user password included in the authentication request from the terminal is legitimate and the second URL is subordinate to the first URL, transmitting a response of which a location header includes the second URL to a browser of the terminal, to cause the browser to download the token retrieval page from the application server and transmit a token retrieved by executing the token retrieval page to the application.

2. An authentication server comprising:
   a processor;
   a memory, wherein the processor executes a process:
   accepting an access request containing application-related information and redirection information stored in an application from the application executed on a terminal, the application-related information including a first URL (Uniform Resource Locator) of an application server corresponding to the application and the redirection information including a second URL of a token retrieval page on the application server;
   obtaining application identification information identifying the application from the application server and transmitting to the terminal an access response containing the obtained application identification information and an interface for inquiring an authentication request to cause the terminal to display the obtained application identification information and the interface on a display unit of the terminal, the application identification information being a logo of the application, a name of the application or a description of the application or any combination thereof; and
   when judging that a user password included in the authentication request from the terminal is legitimate and the second URL is subordinate to the first URL, transmitting a response of which a location header includes the second URL to a browser of the terminal, to cause the browser to download the token retrieval page from the application server and transmit a token retrieved by executing the token retrieval page to the application.

3. A method for authenticating an application in an authentication system comprising a terminal and an authentication server, the method comprising:
   transmitting an access request containing application-related information and redirection information stored in an application from the application executed on the terminal to the authentication server using a processor of the terminal, the application-related information including a first URL (Uniform Resource Locator) of an application server corresponding to the application and the redirection information including a second URL of a token retrieval page on the application server;
   accepting the access request from the application executed on the terminal, obtaining application identification information identifying the application from an application server and transmitting to the terminal an access response containing the obtained application identification information and an interface for inquiring an authentication request to cause the terminal to display the obtained application identification information and the interface on a display unit of the terminal, the application identification information being a logo of the application, a name of the application or a description of the application or any combination thereof using a processor of the authentication server;
   when judging that a user password included in the authentication request from the terminal is legitimate and the second URL is subordinate to the first URL, transmitting a response of which a location header includes the second URL to a browser of the terminal using a processor of the authentication server; and
   when receiving the response from the authentication server, downloading the token retrieval page from the application server by the browser and transmitting a token retrieved by executing the token retrieval page to the application by the browser using the processor of the terminal.

4. An authentication system comprising:
   an authentication server; and
   a terminal, wherein
   the authentication server includes a processor that executes a process
   accepting an access request containing application-related information and redirection information stored in an application from the application executed on the terminal, the application-related information including a first URL (Uniform Resource Locator) of an application server corresponding to the application and the redirection information including a second URL of a token retrieval page on the application server;
   obtaining application identification information identifying the application from an application server;

transmitting to the terminal an access response containing the obtained application identification information and an interface for inquiring an authentication request to cause the terminal to display the obtained application identification information and the interface on a display unit of the terminal, the application identification information being a logo of the application, a name of the application or a description of the application or any combination thereof; and when judging that a user password included in the authentication request from the terminal is legitimate and the second URL is subordinate to the first URL, transmitting a response of which a location header includes the second URL to a browser of the terminal; and the terminal includes a processor that executes transmitting the access request from the application executed on the terminal to the authentication server; and when receiving from the authentication server the response to the access request transmitted at the transmitting, downloading the token retrieval page from the application server by the browser and transmitting a token retrieved by executing the token retrieval page to the application by the browser.

5. A method for authenticating an application in an authentication system comprising a terminal and an authentication server, the method comprising:

transmitting an access request containing application-related information and redirection information stored in an application from the application executed on the terminal to the authentication server using a processor of the terminal, the application-related information including a first URL (Uniform Resource Locator) of an application server corresponding to the application and the redirection information including a second URL of a token retrieval page on the application server;

accepting the access request from the application executing on the terminal, transmitting to the terminal an access response containing an interface for inquiring an authentication request using a processor of the authentication server;

when receiving the interface, displaying the interface on a display unit of the terminal, obtaining application identification information from an application server and displaying the application identification information on the display unit of the terminal, the application identification information being a logo of the application, a name of the application or a description of the application or any combination thereof using a processor of the terminal;

when judging that a user password included in the authentication request from the terminal is legitimate and the second URL is subordinate to the first URL, transmitting a response of which a location header includes the second URL to a browser of the terminal using a processor of the authentication server; and when receiving the response from the authentication server, downloading the token retrieval page from the application server by the browser and transmitting a token retrieved by executing the token retrieval page to the application by the browser using the processor of the terminal.

6. An authentication system comprising:

an authentication server; and a terminal, wherein the authentication server includes a processor that executes a process accepting an access request containing application-related information and redirection information stored in an application from the application executed on the terminal, the application-related information including a first URL (Uniform Resource Locator) of an application server corresponding to the application and the redirection information including a second URL of a token retrieval page on the application server;

transmitting to the terminal an access response containing an interface for inquiring an authentication request; and when judging that a user password included in the authentication request from the terminal is legitimate and the second URL is subordinate to the first URL, transmitting a response of which a location header includes the second URL to a browser of the terminal; and the terminal includes a processor that executes transmitting the access request from the application executed on the terminal to the authentication server;

when receiving the interface, displaying the interface on a display unit of the terminal, obtaining application identification information from an application server and displaying the application identification information on the display unit of the terminal, the application identification information being a logo of the application, a name of the application or a description of the application or any combination thereof; and when receiving from the authentication server the response to the access request transmitted at the transmitting, downloading the token retrieval page from the application server by the browser and transmitting a token retrieved by executing the token retrieval page to the application by the browser.

* * * * *